Oct. 17, 1950 A. C. BOYETTE 2,526,115
FISH LURE
Filed Aug. 11, 1947
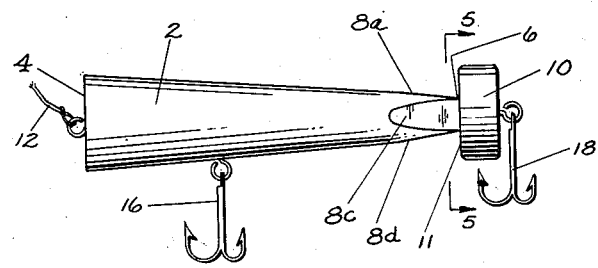
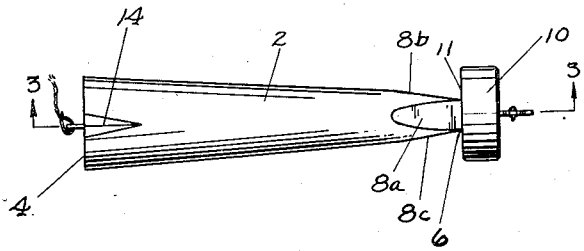
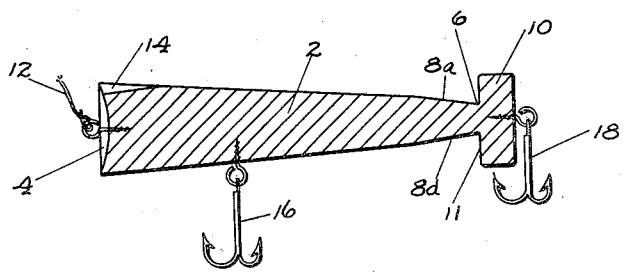
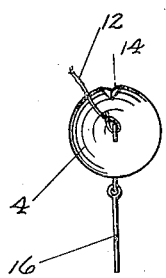
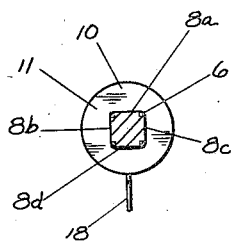
Inventor
A. C. Boyette
By Bailey, Stephens, & Huettig
Attorney Patented Oct. 17, 1950

2,526,115

UNITED STATES PATENT OFFICE 2,526,115

FISH LURE

A. C. Boyette, Felsenthal, Ark.

Application August 11, 1947, Serial No. 767,948

3 Claims. (Cl. 43—42.48)

This invention is directed to a fish lure and in particular to a fish lure which functions as a top water bait and simulates the swimming of a chased minnow.

The object of the invention is to produce a fish bait which more nearly simulates the disurbance of water produced by a live bait, and thus is more of a lure for fish to take the bait than heretofore known fish baits. In general, the object of the invention is accomplished by shaping the fish bait so that the lure will swerve and play in the water like a live minnow while at the same time the water is disturbed by the contours of the bait to produce a water turbulence simulating the action of a minnow and partially obscuring the real shape of the lure. The means by which the objects are obtained may be more fully understood by reference to the accompanying drawings in which:

Fig. 1 is a side elevational view of the fish lure;

Fig. 2 is a top plan view of the fish lure;

Fig. 3 is a cross-sectional view of the fish lure on line 3—3 of Fig. 2;

Fig. 4 is a front elevational view of the fish lure; and

Fig. 5 is a cross-sectional view taken on the line 5—5 of Fig. 1.

The fish lure consists of a conically shaped body 2, made of wood or any other light buoyant material, tapering from the front face or end 4 to the tail end 6. The rearmost end of the tapered body 2 is squared to form the flat faces 8a, 8b, 8c and 8d, respectively, these flattened faces extending from about one-quarter to about one-sixth the length of the cone body 2 at the rear end thereof. A cylindrical tail knob 10 is attached to the rear end of body 2, this knob having a diameter substantially equal to the front end 4 of body 2. This knob has a flat front face 11 which extends at a right angle to the longitudinal axis of the lure. The length of the knob 10 is approximately one-twelfth of the length of body 2.

The front face 4 of the body 2 is dished or made concave, and in the center of this dished portion the leader 12 is attached by any convenient means. A triangular notch 14 extends from the upper side of face 4 into the top portion of the body 2. Fish hooks 16 and 18 are attached to the bottom of the body and to the tail knob 10, respectively.

The fish lure operates as follows: When pulled through the water the fish lure as a top water bait cuts through the surface of the water, the tail end being kept buoyant by the knob 10 so that it floats as high as the front end of the bait. This overcomes the disadvantage of most baits in that the tail end sinks beneath the water. Consequently, the bait is pulled substantially horizontally through the water.

The water striking the dished face 4 causes the formation of a bow wave, and when the bait is pulled fast causes the bait to dart through the water throwing a wake in front of it and makes a light popping noise. This wake makes the bait appear more like a small fish being chased. When the bait is pulled slowly through the water, it will wiggle vertically, and the dished forward end keeps the bait from making too much noise. At the same time, the notch 14 splits and throws up a shield of water partially obscuring a view of the bait body from the fish.

The tapered shape of the bait permits the water to flow along the body 2 until it contacts the forward face 11 of tail knob 10. The flattened faces 8a—d of the bait are for the purpose of allowing a greater amount of water to flow in against the front face 11 of the tail knob 10, and this water is thus caused to break against the face of the knob producing a turbulence which partially obscures the rear of the bait. At the same time, tail knob 10 serves as a drag on a bait keeping the action and movement of the bait more uniform, especially as the bait is being reeled in.

The combination of keeping the bait buoyant both at its front and tail ends so that it travels along the surface of the water, with the turbulence created by the forward face of the bait, the tapered body and the impact of the water against the forward face of knob 10, and the movement given the bait by this turbulence, causes the bait to be partially obscured and simulates an agitated small fish. It has been discovered that the movement thus given the bait is particularly attractive to bass or bar fish, which will readily strike at the bait as it simulates a crippled minnow easily caught.

Having now described the means by which the objects of my invention are obtained, I claim:

1. A fish lure comprising a conically shaped body adapted to lie with its longitudinal axis horizontal, the forward end of said body being concave and having a notch extending longitudinally on the upper side thereof, the notch lying in the vertical plane passing through said axis, said body having a plurality of flattened surfaces located adjacent the tail end of said body and being of polygonal cross-section, a tail member of cylindrical shape at said tail end and having a diameter substantially equal to the forward end of said body, and having a forward flat face perpendicular to said axis, said flattened surfaces terminating against said flat face, and said member having a buoyancy sufficient to cause said lure to float horizontally in water.

2. A lure as in claim 1, said flattened surfaces extending from about one quarter to one-sixth the length of said body, and said tail member having a longitudinal length approximately one-twelfth the length of said body.

3. A lure as in claim 2, said tail end in advance of the tail member of cylindrical shape being tapered to a diameter approximately one-third the diameter of said forward end.

A. C. BOYETTE.

REFERENCES CITED

The following references are of record in the file of this patent:

UNITED STATES PATENTS

| Number | Name | Date |
| --- | --- | --- |
| D. 115,041 | Griffith | May 30, 1939 |
| D. 147,102 | Adams, et al. | July 15, 1947 |
| 1,114,137 | Heddon | Oct. 20, 1914 |
| 1,338,953 | Odell | May 4, 1920 |
| 1,394,313 | Leeper | Oct. 18, 1921 |
| 1,549,792 | O'Keefe | Aug. 18, 1925 |
| 2,262,974 | Steiner | Nov. 18, 1941 |